(12) United States Patent
Nishikuni et al.

(10) Patent No.: US 8,643,902 B2
(45) Date of Patent: Feb. 4, 2014

(54) BI-COLOR-IMAGE-SIGNAL GENERATING APPARATUS, METHOD, AND COMPUTER PROGRAM PRODUCT, AND IMAGE FORMING SYSTEM, USING RELATIVE BRIGHTNESS OF TWO SPECIFIED COLORS

(75) Inventors: Yuichi Nishikuni, Kanagawa (JP);
Atsushi Kitagawara, Kanagawa (JP);
Hidetoshi Kawashima, Kanagawa (JP);
Toshio Koriyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 233 days.

(21) Appl. No.: 13/246,205

(22) Filed: Sep. 27, 2011

(65) Prior Publication Data
US 2012/0250042 A1   Oct. 4, 2012

(30) Foreign Application Priority Data

Mar. 28, 2011 (JP) ................................. 2011-070234

(51) Int. Cl.
*H04N 1/50* (2006.01)
*H04N 1/60* (2006.01)
*G06K 15/02* (2006.01)
*H04N 1/40* (2006.01)
*H04N 1/00* (2006.01)

(52) U.S. Cl.
CPC ......... *H04N 1/40012* (2013.01); *H04N 1/6008* (2013.01); *H04N 1/6016* (2013.01); *H04N 1/6022* (2013.01); *H04N 1/6027* (2013.01); *H04N 1/6072* (2013.01); *H04N 1/00411* (2013.01); *H04N 1/00413* (2013.01); *H04N 1/00482* (2013.01); *G06K 15/1878* (2013.01); *G06K 15/1882* (2013.01); *G06K 15/1884* (2013.01)
USPC .............. 358/2.1; 358/518; 358/521; 358/529

(58) Field of Classification Search
USPC .......... 358/1.9, 2.1, 1.18, 501, 518, 520, 529, 358/530, 521
See application file for complete search history.

(56) References Cited

FOREIGN PATENT DOCUMENTS

JP       2008-067068 A       3/2008

OTHER PUBLICATIONS

English machine translation of JP 2008-067068 A (Nagano) published Mar. 2008.*

* cited by examiner

*Primary Examiner* — Scott A Rogers
(74) *Attorney, Agent, or Firm* — Sughrue Mion, PLLC (57) ABSTRACT

A bi-color-image-signal generating apparatus includes a reception unit and a generating unit. The reception unit receives specification of a specified color in a case of generating a bi-color image signal from a color image signal. The bi-color image signal has color components representing two colors which are an achromatic color and a chromatic color that is the specified color. The generating unit obtains an amount of each color material which is to be used to form an image having the two colors from the color image signal on the basis of a brightness of the specified color, an amount of each color material which is necessary for image formation using the specified color, and a brightness of the color image signal, and generates the bi-color image signal from the color image signal using the obtained amount of each color material.

15 Claims, 9 Drawing Sheets

| INPUT No. | $B_1$ | $G_1$ | $R_1$ | $B_2$ | $G_2$ | $R_2$ | $Y_1$ | $M_1$ | $C_1$ | $K_1$ |
|---|---|---|---|---|---|---|---|---|---|---|
| 1 | 0 | 0 | 0 | 0 | 0 | 0 | 0 | 0 | 0 | 255 |
| 2 | 0 | 0 | 16 | 5 | 5 | 10 | 5 | 5 | 0 | 245 |
| 3 | 0 | 0 | 32 | 10 | 10 | 25 | 15 | 15 | 0 | 230 |
| ... | ... | ... | ... | ... | ... | ... | ... | ... | ... | ... |
| 17 | 0 | 0 | 255 | 0 | 0 | 255 | 255 | 255 | 0 | 0 |
| ... | ... | ... | ... | ... | ... | ... | ... | ... | ... | ... |
| 4625 | 255 | 0 | 0 | 0 | 0 | 128 | 128 | 128 | 0 | 128 |
| ... | ... | ... | ... | ... | ... | ... | ... | ... | ... | ... |
| 4912 | 255 | 255 | 240 | 240 | 240 | 255 | 15 | 15 | 0 | 0 |
| 4913 | 255 | 255 | 255 | 255 | 255 | 255 | 0 | 0 | 0 | 0 |

BI-COLOR-IMAGE-SIGNAL GENERATING APPARATUS, METHOD, AND COMPUTER PROGRAM PRODUCT, AND IMAGE FORMING SYSTEM, USING RELATIVE BRIGHTNESS OF TWO SPECIFIED COLORS

CROSS-REFERENCE TO RELATED APPLICATIONS

This application is based on and claims priority under 35 USC 119 from Japanese Patent Application No. 2011-070234 filed Mar. 28, 2011.

BACKGROUND (i) Technical Field

The present invention relates to a bi-color-image-signal generating apparatus, an image forming system, a bi-color-image-signal generation method, and a computer-readable medium storing a program.

SUMMARY

According to an aspect of the invention, there is provided a bi-color-image-signal generating apparatus including a reception unit and a generating unit. The reception unit receives specification of a specified color in a case of generating a bi-color image signal from a color image signal. The bi-color image signal has color components representing two colors which are an achromatic color and a chromatic color that is the specified color. The generating unit obtains an amount of each color material which is to be used to form an image having the two colors from the color image signal on a print medium on the basis of a brightness of the specified color, an amount of each color material which is necessary for image formation using the specified color on a print medium, and a brightness of the color image signal, and generates the bi-color image signal from the color image signal using the obtained amount of each color material.

BRIEF DESCRIPTION OF THE DRAWINGS

Exemplary embodiment(s) of the present invention will be described in detail based on the following figures, wherein.

DETAILED DESCRIPTION

An exemplary embodiment of the present invention will be described below.

Figure 1:
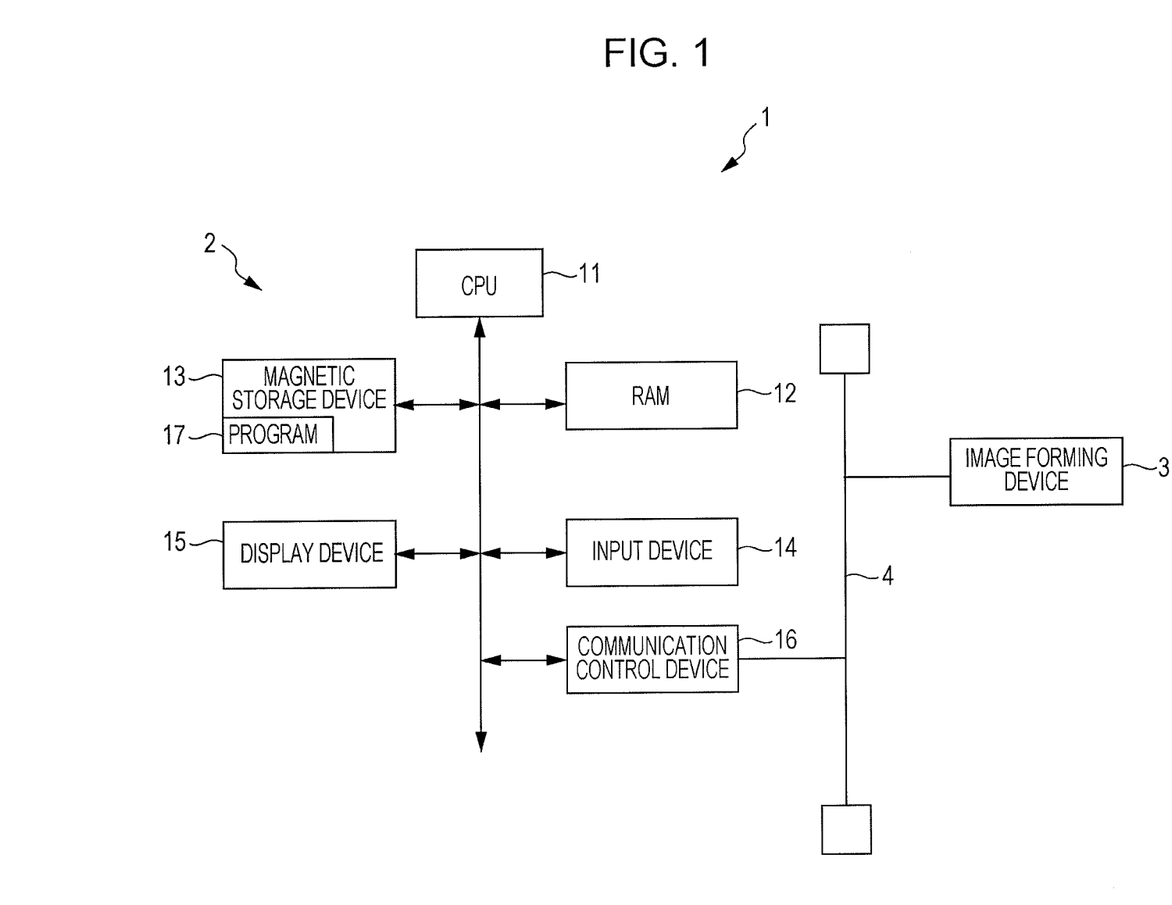
FIG. 1 is a block diagram of an overall configuration of an image forming system according to an exemplary embodiment of the present invention.

FIG. 1 is a block diagram of an overall configuration of an image forming system according to the present exemplary embodiment.

A personal computer (PC) 2 and an image forming device 3 are connected to each other via a network 4, thereby configuring an image forming system 1. The image forming device 3 is a device that forms an image on a print medium such as a sheet of paper. Various methods, such as an electrophotographic method and an inkjet method, may be used as image forming methods by the image forming device 3. Hereinafter, a case of performing image formation using electrophotography will be described as an example. The image forming device 3 is capable of forming a color image using four color materials (toners in the electrophotographic method), i.e., yellow (Y), magenta (M), cyan (C), and black (K).

The PC 2 includes a central processing unit (CPU) 11, a random-access memory (RAM) 12, a magnetic storage device 13, an input device 14, a display device 15, and a communication control device 16. The CPU 11 performs various arithmetic operations, and centrally controls individual devices. The RAM 12 is used as a work area of the CPU 11. The magnetic storage device 13 stores various programs, fixed signals, and so forth. The input device 14 includes a mouse, a keyboard, and so forth. The display device 15 displays an image. The communication control device 16 performs communication with the image forming device 3 via the network 4. A program 17 is set up in the PC 2 so as to serve as a driver of the image forming device 3.

Regarding the program 17, the program 17 that is stored in a storage medium may be read, and be set up in the PC 2. Alternatively, the program 17 may be downloaded from the Internet or the like, and be set up in the PC 2.

Figure 2:
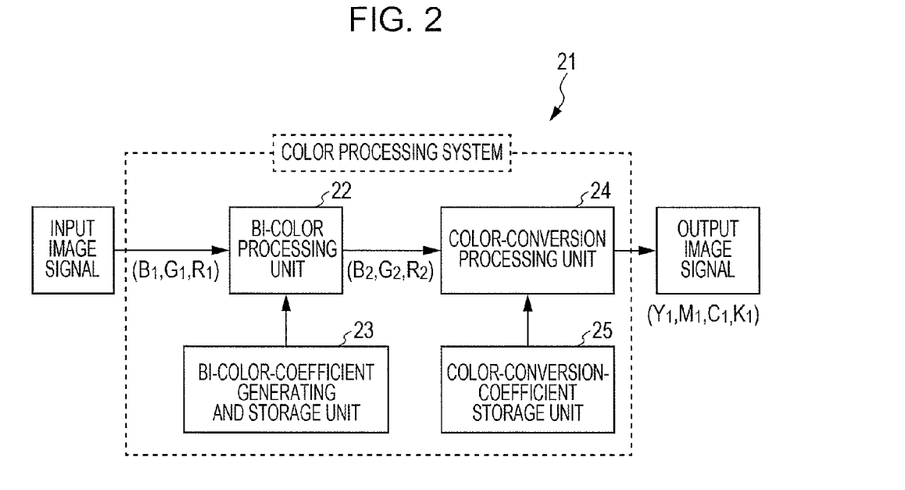
FIG. 2 is a functional block diagram of a color processing system of the image forming system according to the exemplary embodiment of the present invention.

FIG. 2 is a functional block diagram of a color processing system.

The PC 2 realizes a color processing system 21 in accordance with the program 17. However, the color processing system 21 may be realized in the image forming device 3, instead of in the PC 2, in accordance with a control program for controlling the image forming device 3.

A user operates the PC 2 to determine an image signal that is targeted for image formation which is to be performed by the image forming device 3. When the user specifies the image signal and makes a print request of the image forming device 3, the color processing system 21 performs image processing, which is described below, on the image signal.

The image signal that is input is an image signal having color components representing three colors (blue (B), green (G), and red (R)), and is denoted by $(B_1, G_1, R_1)$. A bi-color processing unit 22 performs bi-color processing on the input image signal $(B_1, G_1, R_1)$. In other words, the input image signal $(B_1, G_1, R_1)$ is a full-color image signal. The input image signal $(B_1, G_1, R_1)$ is converted into an image signal $(B_2, G_2, R_2)$ of a bi-color image that has two colors, i.e., an achromatic color and one specific chromatic color (hereinafter, referred so as a "specified color" in some cases) that is specified by a user. Examples of the bi-color image include an image having black and red. A bi-color-coefficient generating and storage unit 23 generates bi-color coefficients that are coefficients used for bi-color processing by the bi-color processing unit 22, and stores and holds the generated bi-color coefficients.

A color-conversion processing unit 24 performs color-conversion processing on the image signal $(B_2, G_2, R_2)$ of a bi-color image, which has been generated by the bi-color processing unit 22, thereby generating an output image signal $(Y_1, M_1, C_1, K_1)$. In other words, an image signal that is represented in a color space defined by three colors, i.e., blue (B), green (G), and red (R), is subjected to color conversion so as to be converted into an image signal that is represented in a color space defined by four colors, i.e., yellow (Y), magenta (M), cyan (C), and black (K). A color-conversion-coefficient storage unit 25 stores color-conversion coefficients that are coefficients used for color-conversion processing by the color-conversion processing unit 24. Note that, in the color processing system 21, it is necessary to assume, for certain values of the input image signal $(B_1, G_1, R_1)$, the corresponding values of the output image signal $(Y_1, M_1, C_1, K_1)$. For this reason, the bi-color processing unit 22 needs to convert the input image signal $(B_1, G_1, R_1)$ into the image signal $(B_2, G_2, R_2)$ of a bi-color image under the assumption that the color-conversion processing unit 24 outputs, for certain values of the input image signal $(B_2, G_2, R_2)$ of a bi-color image, the output image signal $(Y_1, M_1, C_1, K_1)$ having the corresponding values, which are the corresponding color-conversion coefficients. Accordingly, it is necessary to generate bi-color coefficients with reference to the color-conversion coefficients.

Furthermore, referring to FIG. 2, although bi-color processing and color-conversion processing are separately performed at two stages, the bi-color processing and color-conversion processing may be performed simultaneously.

Figure 3:
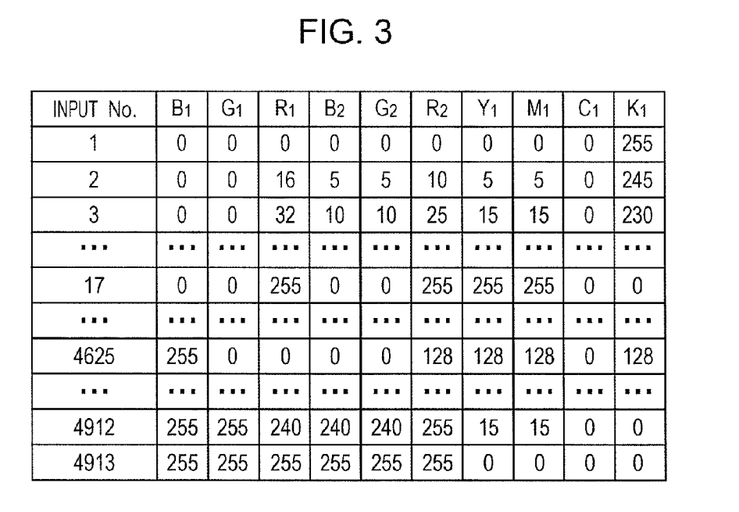
FIG. 3 is a table illustrating an example of, for an input image signal having certain values, the corresponding values of an image signal of a bi-color image and an output image signal in the image forming system according to the exemplary embodiment of the present invention.

FIG. 3 is a table illustrating an example of, for the input image signal $(B_1, G_1, R_1)$ having certain values, the corresponding values of the image signal $(B_2, G_2, R_2)$ of a bi-color image and the output image signal $(Y_1, M_1, C_1, K_1)$. Because the input image signal $(B_1, G_1, R_1)$ is a full-color image signal, 256×256×256 patterns exist as combinations of color components $B_1$, $G_1$, and $R_1$. In the example illustrated in FIG. 3, 4913 discrete patterns among the 256×256×256 patterns are defined. Regarding patterns that are not defined here, values of the image signal $(B_2, G_2, R_2)$ of a bi-color image and the output image signal $(Y_1, M_1, C_1, K_1)$ for the input image signal $(B_1, G_1, R_1)$ can be obtained by performing a complementary process on defined values.

Figure 11:
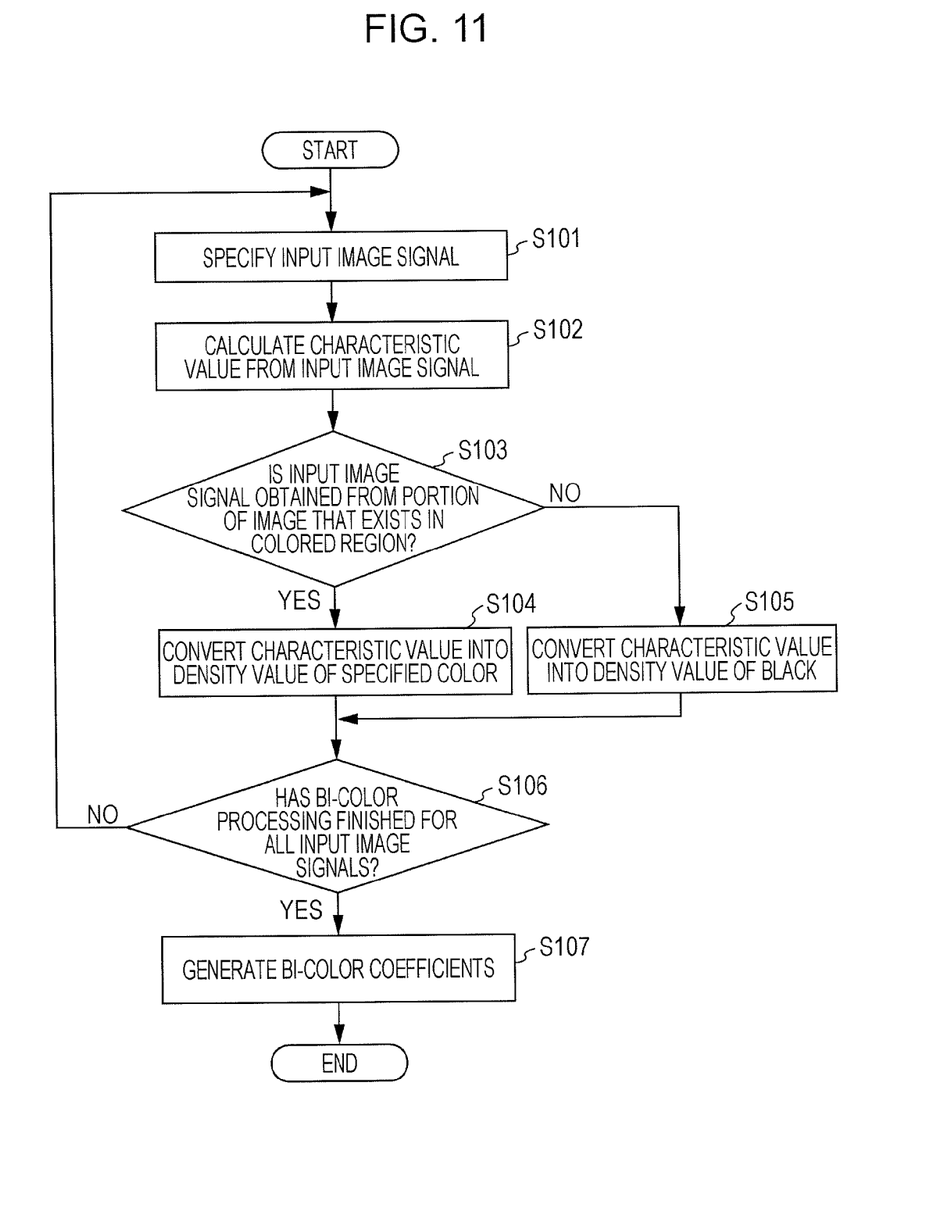
FIG. 11 is a flowchart for explaining a process, which is provided as a comparative example, of obtaining bi-color coefficients.

FIG. 11 is flowchart of a process of generating bi-color coefficients, and the process is provided as a comparative example that is compared with a process, which is described below with reference to FIGS. 4 to 6, in the present exemplary embodiment.

In this process, first, an input image signal (which is represented in one of various color spaces, such as an RGB color space and a Lab color space) of an image that is to be converted into a bi-color image is specified (step S101). A characteristic value of the input image signal is calculated from the input image signal (step S102). Then, whether or not each portion of the image exists in a colored region, i.e., exists in a region that has a certain fixed saturation or a hue region (colored region) that is determined in advance, is determined from the input image signal (step S103). When a portion of the image exists in a colored region (YES in step S103), the characteristic value is converted into a density value of a specified color (step S104). When a portion of the image does not exist in a colored region (NO in step S103), the characteristic value is converted into a density value of K (step S105). In this manner, when bi-color processing has finished for all of input image signals (YES in step S106), bi-color coefficients are generated (step S107).

In the process that is provided as a comparative example, whether or not each portion of the image exists in a colored region is determined in step S103, thereby determining whether a specified color or K is to be used. Differently from the above-mentioned process in the present exemplary embodiment, when the process is performed for a portion of the image that has been determined to be a boundary portion of a threshold which is used as a determination reference, a natural tone is not easily maintained by reproducing the tone before and after the process is performed for the portion of the image that has been determined to be a boundary portion of the threshold.

Figure 4:
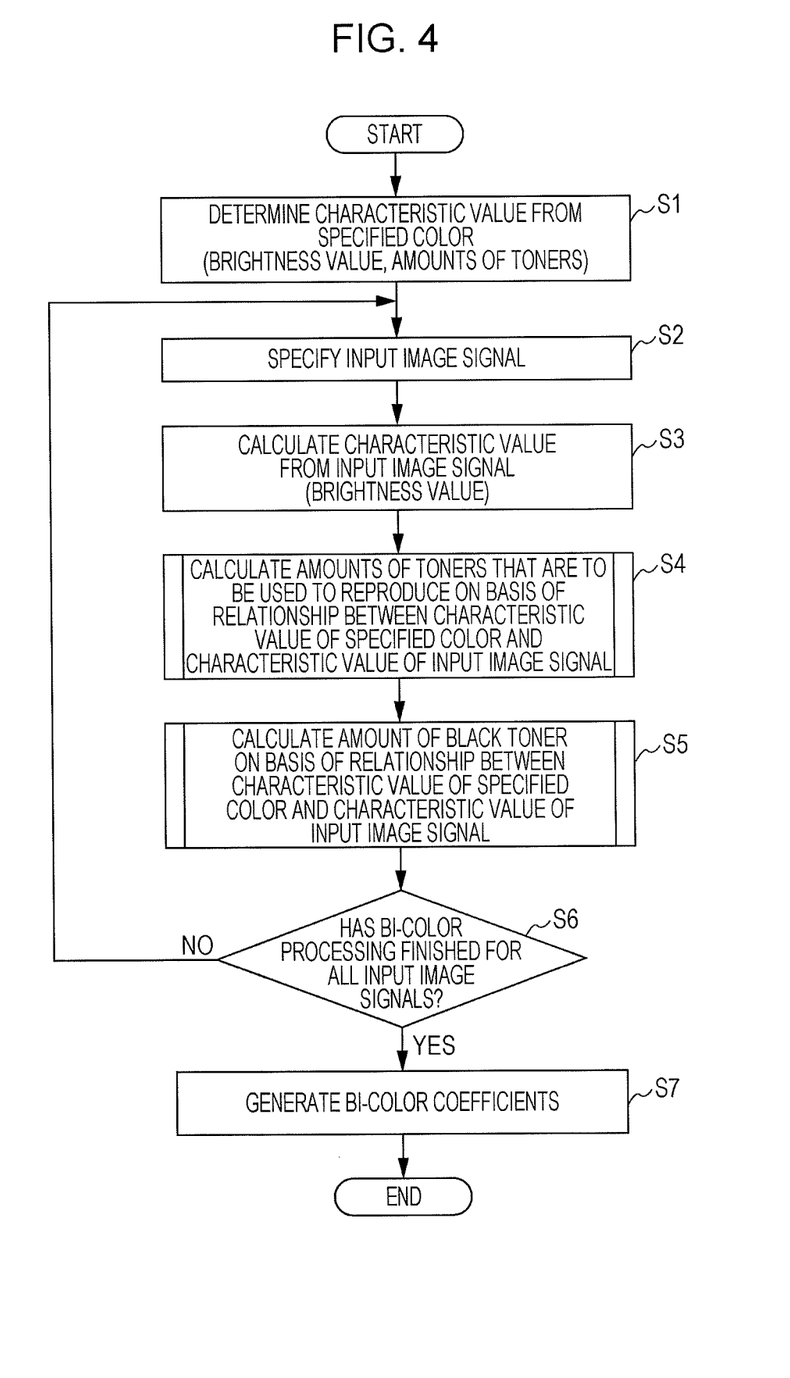
FIG. 4 is a flowchart for explaining a process of obtaining bi-color coefficients using the color processing system of the image forming system according to the exemplary embodiment of the present invention.
Figure 5:
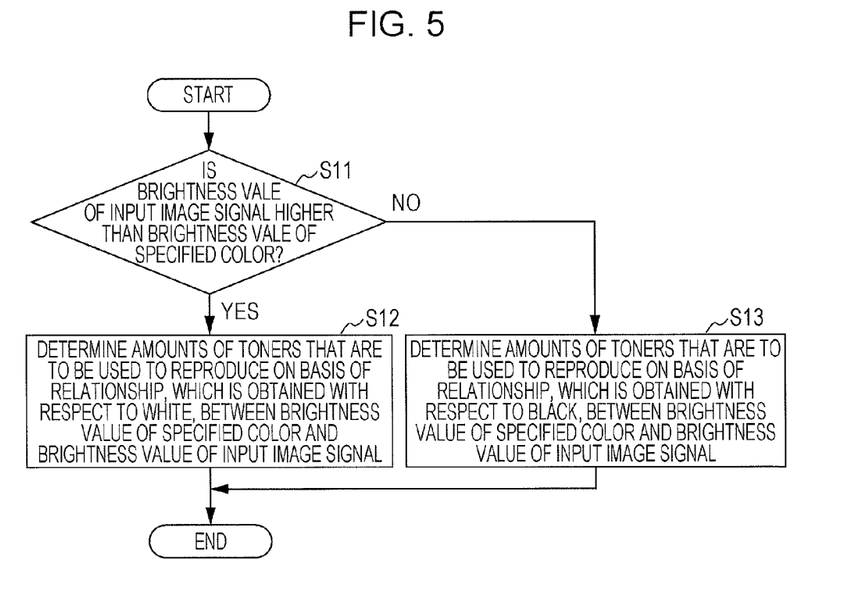
FIG. 5 is a flowchart for explaining the process of obtaining bi-color coefficients using the color processing system of the image forming system according to the exemplary embodiment of the present invention.
Figure 6:
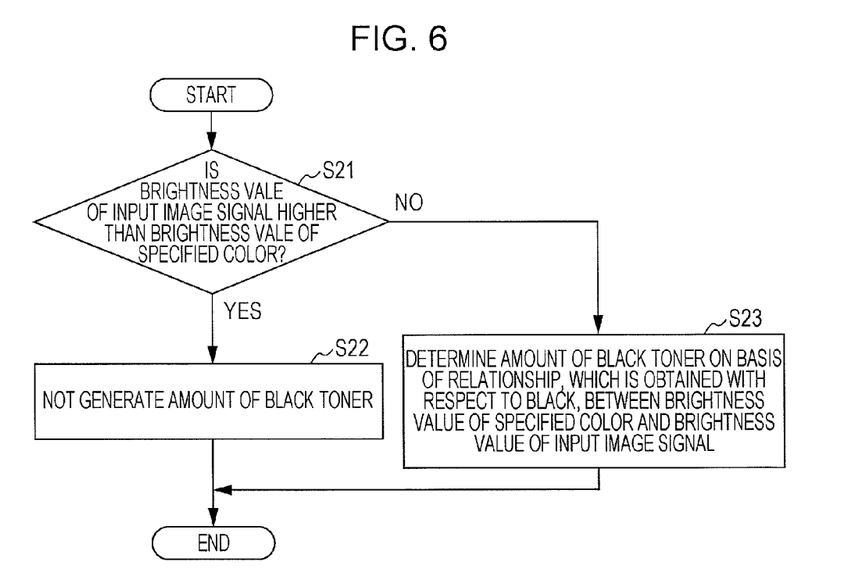
FIG. 6 is a flowchart for explaining the process of obtaining bi-color coefficients using the color processing system of the image forming system according to the exemplary embodiment of the present invention.

FIGS. 4 to 6 are flowcharts for explaining a process of obtaining bi-color coefficients using the color processing system 21 in the present exemplary embodiment.

In the description given below, BI-B denotes a color component B of an image signal representing a specified color. BI-G denotes a color component G of the image signal representing the specified color. BI-R denotes a color component R of the image signal representing the specified color. $L_{bicolor}$ denotes a brightness value of the specified color. $Y_{bicolor}$ denotes an amount of Y toner of the specified color. $M_{bicolor}$ denotes an amount of M toner of the specified color. $C_{bicolor}$ denotes an amount of C toner of the specified color. $Y_{target}$ denotes a target amount of Y toner for the specified color. $M_{target}$ denotes a target amount of M toner for the specified color. $C_{target}$ denotes a target amount of C toner for the specified color. DENS denotes a density coefficient. Lrate-B denotes a brightness calculation coefficient of B. Lrate-G denotes a brightness calculation coefficient of G. Lrate-R denotes a brightness calculation coefficient of R. IN-B denotes a color component B ($B_1$) of an input image signal. IN-G denotes a color component G ($G_1$) of the input image signal. IN-R denotes a color component R ($R_1$) of the input image signal. IN-L denotes a brightness value of the input image signal. OUT-Y denotes a color component Y ($Y_1$) of an output image signal for the input image signal. OUT-M denotes a color component M ($M_1$) of the output image signal for the input image signal. OUT-C denotes a color component C ($C_1$) of the output image signal for the input image signal. OUT-K denotes a color component K ($K_1$) of the output image signal for the input image signal. OUT-B denotes a color component B ($B_2$) of an image signal, which is calculated from the output image signal (Y, M, C, K), of a bi-color image. OUT-G denotes a color component G ($G_2$) of the image signal, which is calculated from the output image signal (Y, M, C, K), of a bi-color image. OUT-R denotes a color component R ($R_2$) of the image signal, which is calculated from the output image signal (Y, M, C, K), of a bi-color image.

FIG. 4 will be described. The process given below can be performed with reference to the table illustrated in FIG. 3. First, a characteristic value of one chromatic color (for example, if the chromatic color is red, red is represented by an equation (B, G, R)=(0, 0, 255)) that is specified by a user is calculated from the chromatic color that is a specified color (step S1). Here, the characteristic value includes a brightness value (which may be referred to as an intensity value, a luminance value, or the like), and amounts of toners. Here, the amounts of toners are amounts of color materials. Because a case of performing image formation using electrophotography is described, the amounts of color materials are the amounts of toners. The amounts of toners in this case are indicated by values of color components of an output image signal ($Y_1$, $M_1$, $C_1$) that is obtained by performing bi-color processing and color-conversion processing on an image signal representing the specified color. For example, if the specified color is red, referring to FIG. 3, red is represented by an equation ($B_1$, $G_1$, $R_1$)=(0, 0, 255), and the amounts of toners are indicated by values of color components, which are represented by an equation ($Y_1$, $M_1$, $C_1$)=(255, 255, 0), of an output image signal.

Calculation of the characteristic value can be performed using Equations (1) to (4). Note that various schemes including Equations (1) to (4) can be used as specific calculation schemes. Accordingly, each Equation given below is expressed only in function form.

$$L_{bicolor}=f(BI\text{-}B, BI\text{-}G, BI\text{-}R, L\text{rate-}B, L\text{rate-}G, L\text{rate-}R) \quad (1)$$

$$Y_{bicolor}=f(Y_{target}, DENS) \quad (2)$$

$$M_{bicolor}=f(M_{target}, DENS) \quad (3)$$

$$C_{bicolor}=f(C_{target}, DENS) \quad (4)$$

Here, the brightness value $L_{bicolor}$ of the specified color in Equation (1) can be obtained, for example, by multiplying the color component BI-B, which is a color component B of the image signal representing the specified color, the color component BI-G, which is a color component G of the image signal representing the specified color, and the color component BI-R, which is a color component R of the image signal representing the specified color, by the brightness calculation coefficient Lrate-B of B, the brightness calculation coefficient Lrate-G of G, and the brightness calculation coefficient Lrate-R of R, respectively.

Next, an input image signal is specified (step S2). That is, a user operates the PC 2 to make a print request of the image forming device 3 for bi-color printing, and an image signal for the print request is specified.

Next, a characteristic value is calculated from the input image signal (step S3). Here, a characteristic value is a brightness value (which may be referred to as an intensity value, a luminance value, or the like).

Calculation of the characteristic value is performed using Equation (5) given below.

$$IN\text{-}L=f(IN\text{-}B, IN\text{-}G, IN\text{-}R, L\text{rate-}B, L\text{rate-}G, L\text{rate-}R) \quad (5)$$

Here, the brightness value IN-L of the input image signal in Equation (5) can be obtained, for example, by multiplying the color component IN-B, which is a color component B of the input image signal, the color component IN-G, which is a color component G of the input image signal, and the color component IN-R, which is a color component R of the input image signal, by the brightness calculation coefficient Lrate-B of B, the brightness calculation coefficient Lrate-G of G, and the brightness calculation coefficient Lrate-R of R, respectively.

Next, amounts of toners that are to be used to perform image formation using the specified color are calculated on the basis of the relationship between the characteristic value of the specified color and the characteristic value of the input image signal, which are obtained above, (step S4). For example, if the specified color is red, amounts of Y toner and M toner are calculated. Calculation in this case is performed using Equations (6) to (8) given below. A specific example of this process in step S4 will be described below with reference to FIG. 5.

$$OUT\text{-}Y=f(IN\text{-}L, L_{bicolor}, Y_{bicolor}) \quad (6)$$

$$OUT\text{-}M=\theta(IN\text{-}L, L_{bicolor}, M_{bicolor}) \quad (7)$$

$$OUT\text{-}C=f(IN\text{-}L, L_{bicolor}, C_{bicolor}) \quad (8)$$

Next, an amount of K toner is calculated on the basis of the relationship between the characteristic value of the specified color and the characteristic value of the input image signal, which are obtained above (step S5). Calculation in this case is performed using Equation (9) given below. A specific example of this process in step S5 will be described below with reference to FIG. 6. Note that continuity of a K image is maintained by using different equations for calculation in steps S4 and S5.

$$OUT\text{-}K=f(IN\text{-}L, L_{bicolor}) \quad (9)$$

Next, when bi-color processing has not finished for all input image signals (NO in step S6), the process returns to step S2. When bi-color processing has finished for all input image signals (YES in step S6), bi-color coefficients are generated (step S7). Generation of bi-color coefficient can be performed using Equations (10) to (12) given below. Two types of equations are prepared as each of Equations (10) to (12). Either one of the two types of equations can be selected in accordance with the contents of color-conversion processing. Here, bi-color coefficients ($B_2$, $G_2$, $R_2$) are calculated so that color components ($Y_1$, $M_1$, $C_1$, $K_1$) calculated in steps S4 and S5 can be reproduced using the color-conversion coefficients used by the color-conversion processing unit 24.

$$OUT\text{-}B=f(OUT\text{-}Y, OUT\text{-}M, OUT\text{-}C, OUT\text{-}K) \text{ or } f(OUT\text{-}Y, OUT\text{-}K) \quad (10)$$

$$OUT\text{-}G=f(OUT\text{-}Y, OUT\text{-}M, OUT\text{-}C, OUT\text{-}K) \text{ or } f(OUT\text{-}M, OUT\text{-}K) \quad (11)$$

$$OUT\text{-}R=f(OUT\text{-}Y, OUT\text{-}M, OUT\text{-}C, OUT\text{-}K) \text{ or } f(OUT\text{-}C, OUT\text{-}K) \quad (12)$$

FIG. 5 illustrates a subroutine of step S4. In step S4, first, whether or not the brightness value (which may be referred to as an intensity value, a luminance value, or the like) of the specified color is higher than the brightness value of the input image signal is determined (step S11).

When the brightness value of the specified color is higher than the brightness value of the input image signal (YES in step S11), amounts of toners that are to be used to reproduce the specified color in a case of image formation are determined on the basis of the relationship, which is obtained with respect to white (that is represented by an equation (B, G, R)=(255, 255, 255)), between the brightness value of the specified color and the brightness value of the input image signal (step S12). When the brightness value of the specified color is not higher than the brightness value of the input image signal (NO in step S11), amounts of toners that are to be used to reproduce the specified color in a case of image formation are determined on the basis of the relationship, which is obtained with respect to black (that is represented by an equation (B, G, R)=(0, 0, 0)), between the brightness value of the specified color and the brightness value of the input image signal (step S13).

FIG. 6 illustrates a subroutine of step S5. In step S5, first, whether or not the brightness value (which may be referred to as an intensity value, a luminance value, or the like) of the specified color is higher than the brightness value of the input image signal is determined (step S21). When the brightness value of the specified color is higher than the brightness value of the input image signal (YES in step S21), an amount of K toner is not generated (step S22). In this case, K toner is not used. Accordingly, a tone is reproduced by continuously changing the amounts of toners used to reproduce the specified color.

When the brightness value of the specified color is not higher than the brightness value of the input image signal (NO in step S21), an amount of K toner is determined on the basis of the relationship, which is obtained with respect to black (that is represented by the equation (B, G, R)=(0, 0, 0)), between the brightness value of the specified color and the brightness value of the input image signal (step S23). In other words, regarding an input image signal having a brightness value that is lower than the brightness value of the specified color, the amount of K toner is changed in accordance with a brightness ratio, whereby a tone is reproduced by continuously changing the amount of K toner and the amounts of toners used to reproduce the specified color.

In the present process, the saturation values of the input image signal and the specified color are not considered. A bi-color image that is tinted the specified color is generated for an input image signal having no saturation that is an image signal representing gray.

Figure 7:
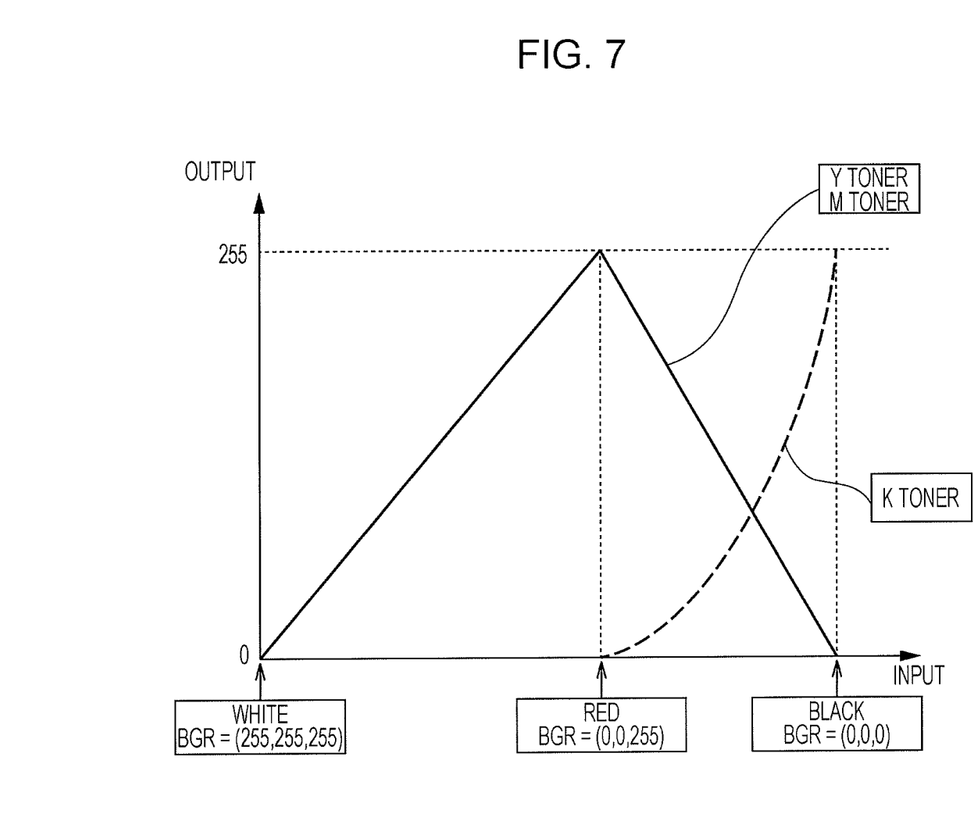
FIG. 7 is a graph illustrating an example of change in the output image signal for the input image signal that ranges from white to red and from red to black in a case in which image formation is performed using two colors, i.e., black and red that is a specified color, by the color processing system of the image forming system according to the exemplary embodiment of the present invention.

FIG. 7 is a graph illustrating an example of change in the output image signal (Y, M, C, K) for the input image signal that ranges from white (which is represented by the equation (B, G, R)=(255, 255, 255)) to red (which is represented by the equation (B, G, R)=(0, 0, 255)) and from red (which is represented by the equation (B, G, R)=(0, 0, 255)) to black (which is represented by the equation (B, G, R)=(0, 0, 0)) in a case in which image formation is performed using two colors, i.e., black and red that is the specified color, by the above-described process. The vertical axis represents a tone (which ranges from 0 to 255) of each color, i.e., Y, M, C, or K.

A red portion that is provided with respect to values represented by the equation (B, G, R) (0, 0, 255) is reproduced using amounts of Y toner and M toner. A color between red and white is expressed using a tone of red that is reproduced by an amount of Y toner and an amount of M toner. The amounts of Y toner and M toner decrease as a reproduced color is lighter (see step S12). Furthermore, as the reproduced color changes from red to black, the amount of K toner gradually increases, and the amounts of Y toner and M toner decrease (see step S13). A tone is maintained as a result of outputting an image.

Figure 8:
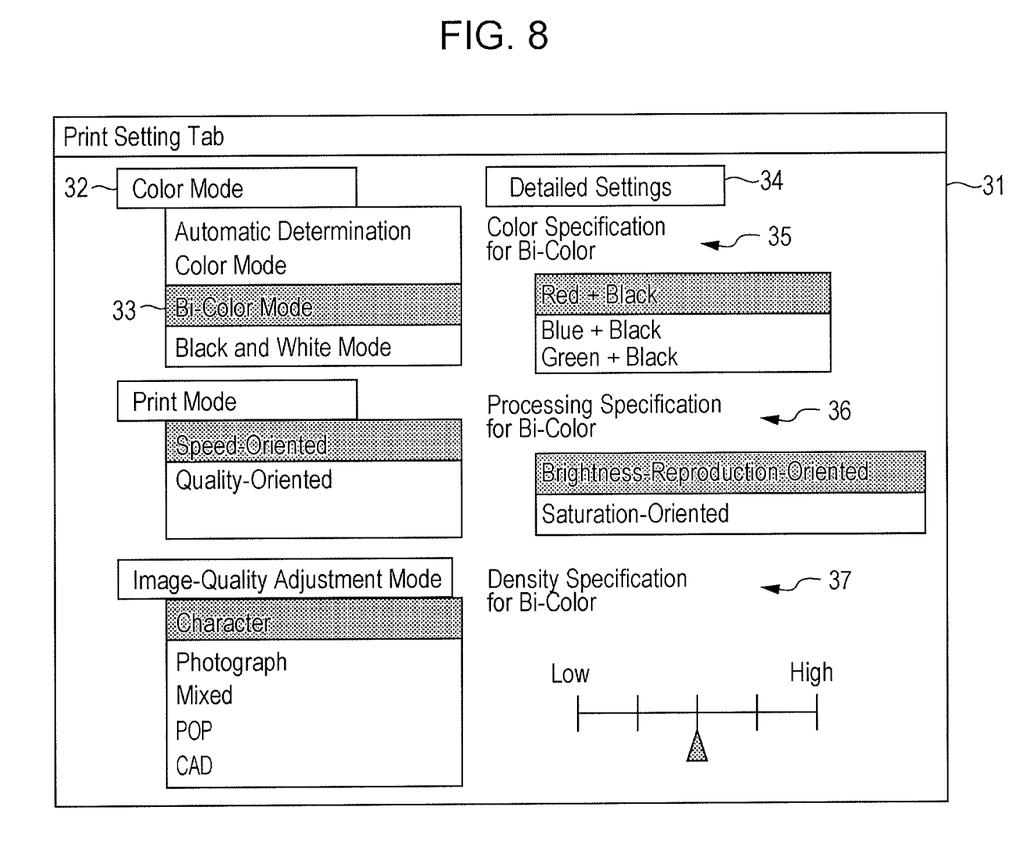
FIG. 8 is an example of a screen display of a print setting tab that is displayed in accordance with a program on a display device of a personal computer in the image forming system according to the exemplary embodiment of the present invention.

FIG. 8 is an example of a screen display of a print setting tab that is displayed in accordance with the program 17 on the display device 15 of the PC 2.

In a case of causing the image forming device 3 to form a bi-color image having an achromatic color and a specified color as described above, a user selects a bi-color mode 33 in a color mode 32 of a print setting tab 31. Then, when the bi-color mode 33 is selected, settings can be set in detailed settings 34. First, a specified color can be selected in a color specification 35 for bi-color. As in the above-described example, in a case of selecting red as a specified color for an achromatic color, "Red+Black" is selected as illustrated in FIG. 8.

Furthermore, either "Brightness-Reproduction-Oriented" or "Saturation-Oriented" can be selected in a processing specification 36 for bi-color. When "Brightness-Reproduction-Oriented" is selected, an image in which reproduction of brightness is oriented is formed as a bi-color image. Moreover, when "Saturation-Oriented" is selected, an image in which reproduction of saturation is oriented is formed as a bi-color image.

Such a "Brightness-Reproduction-Oriented" or "Saturation-Oriented" image can be expressed by adjusting each of the brightness calculation coefficients Lrate-B, Lrate-G, and Lrate-R in Equation (1).

Additionally, the color density, which indicates the degree of light and dark, of an image can be selected in a density specification 37 for bi-color. The color density of an image can be adjusted using the density coefficient DENS in Equations (3) to (5). With the density coefficient DENS, the density of red can be reduced or increased with respect to red, which is the specified color and which is represented by the equation (B, G, R)=(0, 0, 255).

Figure 9:
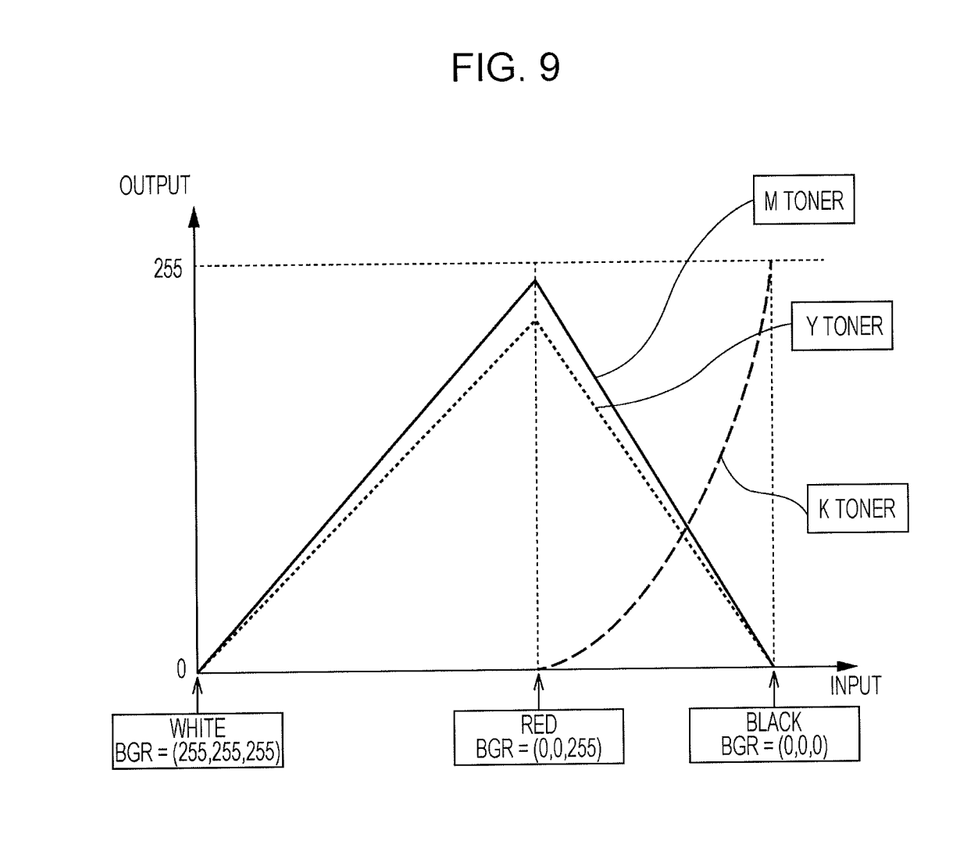
FIG. 9 is a graph illustrating an example of change in the output image signal for the input image signal that ranges from white to red and from red to black in a case in which image formation is performed using two colors, i.e., black and red that is a specified color, by the color processing system of the image forming system according to the exemplary embodiment of the present invention.

FIG. 9 illustrates an example in a case in which the color density of an image is reduced, compared with the color density of the image, which is used as a reference, in the example illustrated in FIG. 7. With respect to red that is the specified color and that is represented by the equation (B, G, R)=(0, 0, 255), the amount of M toner in the example illustrated in FIG. 9 is smaller than the amount of M toner in the example illustrated in FIG. 7. The amount of Y toner is further reduced. With the reduced amounts of M toner and Y toner, the color density of the image in the example illustrated in FIG. 9 is lower than the color density of the image in the example illustrated in FIG. 7.

Figure 10:
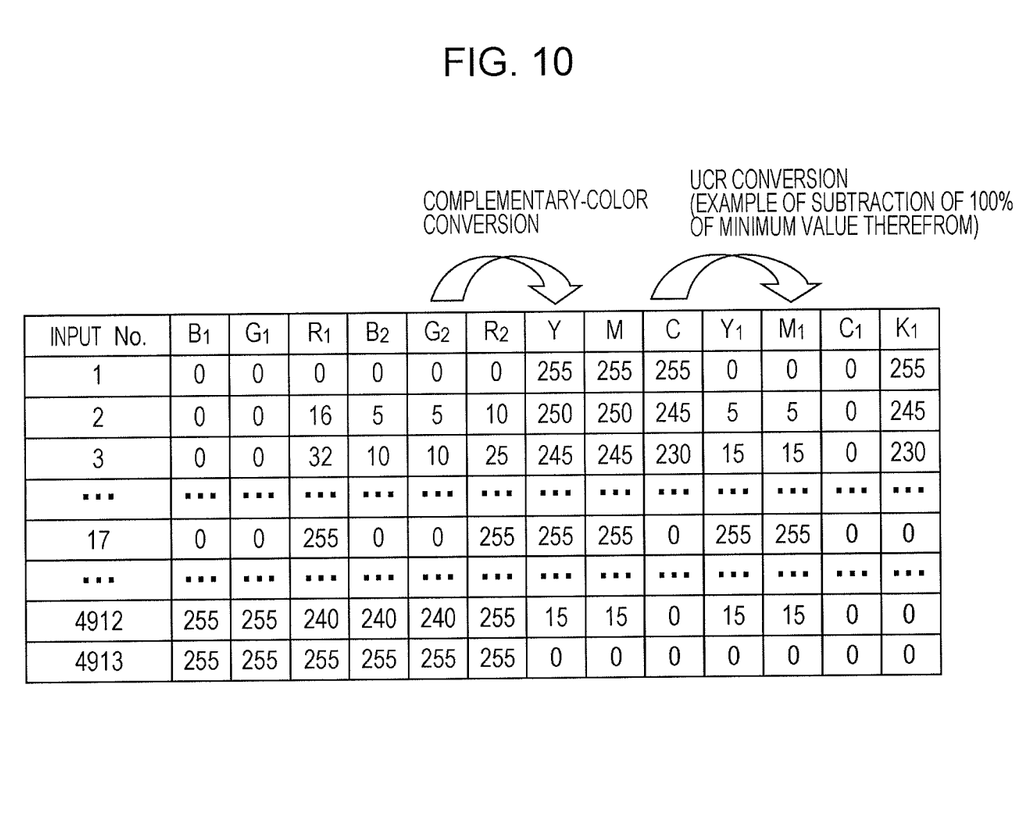
FIG. 10 is a table illustrating an example of, for the input image signal having certain values, the corresponding values of the image signal of a bi-color image and the output image signal in the image forming system according to the exemplary embodiment of the present invention.

FIG. 10 is a table illustrating an example of, for the input image signal ($B_1$, $G_1$, $R_1$) having certain values, the corresponding values of the image signal ($B_2$, $G_2$, $R_2$) of a bi-color image and the output image signal ($Y_1$, $M_1$, $C_1$, $K_1$). The difference between the example illustrated in FIG. 10 and the example illustrated in FIG. 3 is that, in a case of converting the image signal ($B_2$, $G_2$, $R_2$) of a bi-color image into the output image signal ($Y_1$, $M_1$, $C_1$, $K_1$), first, the image signal ($B_2$, $G_2$, $R_2$) of a bi-color image is subjected to complementary-color conversion to generate an image signal (Y, M, C), and that the image signal (Y, M, C) is subjected to under color removal (UCR) conversion, thereby converting the image signal ($B_2$, $G_2$, $R_2$) of a bi-color image into the output image signal ($Y_1$, $M_1$, $C_1$, $K_1$).

Both complementary-color conversion and UCR conversion are generally used color conversion parameters, and do not depend on the characteistics of the image forming device 3. Accordingly, if the above-descried bi-color processing is performed under the assumption that color-conversion processing is performed using the color conversion parameters by the image forming device 3, it is unnecessary to consider, as parameters for the bi-color processing, color conversion parameters for each of image forming devices 3 that are different from one another, and the same color conversion parameters can be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A bi-color-image-signal generating apparatus comprising:
   a reception unit configured to receive specification of a specified color in a case of generating a bi-color image signal from a color image signal, the bi-color image signal including color components representing two colors which are an achromatic color and a chromatic color that is the specified color; and
   a generating unit configured to obtain an amount of each color material which is to be used to form an image having the two colors from the color image signal on a print medium, and to generate the hi-color image signal from the color image signal using the obtained amount of each color material, wherein
   the generating unit obtains the amount of each color material using information including:
      a brightness of the specified color;
      an amount of each color material which is necessary for image formation using the specified color on the print medium, and
      a brightness of the color image signal.

2. The bi-color-image-signal generating apparatus according to claim 1, wherein the generating unit is configured to obtain the brightness of the specified color by multiplying a color component of an image signal representing the specified color by a coefficient that is determined in advance, and to obtain the brightness of the color image signal by multiplying the color component of the color image signal by the coefficient.

3. The bi-color-image-signal generating apparatus according to claim 1, wherein the generating unit is configured to generate the bi-color image signal on the basis of a density of the specified color in the bi-color image signal that is provided with respect to a density of the same color in the color image signal, and, in response to a request being made, the generating unit changes the density of the specified color from the density of the same color in the color image signal.

4. The bi-color-image-signal generating apparatus according to claim 2, wherein the generating unit is configured to generate the bi-color image signal on the basis of a density of the specified color in the bi-color image signal that is provided with respect to a density of the same color in the color image signal, and, in response to a request being made, the generating unit changes the density of the specified color from the density of the same color in the color image signal.

5. The bi-color-image-signal generating apparatus according to claim 1, wherein, for the color image signal having a brightness higher than the brightness of the specified color, the generating unit generates the bi-color image signal that is reproduced using only the specified color, and, for the color image signal having a brightness equal to or lower than the brightness of the specified color, generates the bi-color image signal that is reproduced using a combination of the achromatic color and the specified color.

6. The bi-color-image-signal generating apparatus according to claim 2, wherein, for the color image signal having a brightness higher than the brightness of the specified color, the generating unit generates the bi-color image signal that is reproduced using only the specified color, and, for the color image signal having a brightness equal to or lower than the brightness of the specified color, generates the bi-color image signal that is reproduced using a combination of the achromatic color and the specified color.

7. The bi-color-image-signal generating apparatus according to claim 1, wherein the generating unit generates the bi-color image signal under an assumption that the bi-color image signal, which has been generated by the generating unit, is to be subjected to complementary-color conversion, and that the bi-color image signal, which has been subjected to complementary-color conversion, is to be subjected to under-cover-removal conversion.

8. The bi-color-image-signal generating apparatus according to claim 2, wherein the generating unit generates the bi-color image signal under an assumption that the bi-color image signal, which has been generated by the generating unit, is to be subjected to complementary-color conversion, and that the bi-color image signal, which has been subjected to complementary-color conversion, is to be subjected to under-cover-removal conversion.

9. The bi-color-image-signal generating apparatus according to claim 3, wherein the generating unit generates the bi-color image signal under an assumption that the bi-color image signal, which has been generated by the generating unit, is to be subjected to complementary-color conversion, and that the bi-color image signal, which has been subjected to complementary-color conversion, is to be subjected to under-cover-removal conversion.

10. The bi-color-image-signal generating apparatus according to claim 4, wherein the generating unit generates the bi-color image signal under an assumption that the bi-color image signal, which has been generated by the generating unit, is to be subjected to complementary-color conversion, and that the bi-color image signal, which has been subjected to complementary-color conversion, is to be subjected to under-cover-removal conversion.

11. The bi-color-image-signal generating apparatus according to claim 5, wherein the generating unit generates the bi-color image signal under an assumption that the bi-color image signal, which has been generated by the generating unit, is to be subjected to complementary-color conversion, and that the bi-color image signal, which has been subjected to complementary-color conversion, is to be subjected to under-cover-removal conversion.

12. The bi-color-image-signal generating apparatus according to claim 6, wherein the generating unit generates the bi-color image signal under an assumption that the bi-color image signal, which has been generated by the generating unit, is to be subjected to complementary-color conversion, and that the bi-color image signal, which has been subjected to complementary-color conversion, is to be subjected to under-cover-removal conversion.

13. An image forming system comprising:
   the color-image-signal generating apparatus according to claim 1; and
   an image forming unit that performs image formation on the basis of the bi-color image signal which has been generated by the generating unit.

14. A bi-color-image-signal generation method comprising:

receiving specification of a specified color in a case of generating a bi-color image signal from a color image signal, the bi-color image signal including color components representing two colors which are an achromatic color and a chromatic color that is the specified color;

obtaining an amount of each color material which is to be used to form an image including the two colors from the color image signal on a print medium: and generating the bi-color image signal from the color image signal using the obtained amount of each color material, wherein the amount of each color material is obtained using information including:
- a brightness of the specified color;
- an amount of each color material which is necessary for image formation using the specified color on a print medium; and
- a brightness of the color image signal.

15. A non-transitory computer-readable medium storing a program causing a computer to execute a process for generating a bi-color image signal, the process comprising:

obtaining an amount of each color material which is to be used to form an image having two colors from the color image signal; and generating a bi-color image signal using the obtained amount of each color material, the bi-color image signal being an image signal of the image having the two colors, wherein the amount of each color material is obtained using information including:
- a brightness of a specified, color that is a chromatic color specified in advance;
- an amount of each color material that is necessary to reproduce the specified color; and
- a brightness of a color image signal that is a target, and the two colors being an achromatic color and the specified color.

* * * * *